United States Patent [19]

Keil et al.

[11] Patent Number: 5,324,366
[45] Date of Patent: Jun. 28, 1994

[54] HEAT TREAT FURNACE SYSTEM FOR PERFORMING DIFFERENT CARBURIZING PROCESSES SIMULTANEOUSLY

[75] Inventors: Gary D. Keil, Elmwood; Loren D. Thompson, deceased, late of Pekin, both of Ill., by Gail G. Thompson, executrix

[73] Assignee: Caterpillar Inc., Peoria, Ill.

[21] Appl. No.: 742,818

[22] Filed: Aug. 9, 1991
(Under 37 CFR 1.47)

[51] Int. Cl.$^5$ .................................. C21D 9/00
[52] U.S. Cl. .................. 148/207; 148/206; 148/225
[58] Field of Search .......... 148/206, 207, 210, 225; 266/252

[56] References Cited

U.S. PATENT DOCUMENTS

| | | | |
|---|---|---|---|
| 3,662,996 | 5/1972 | Schwalm et al. | 148/206 |
| 4,622,006 | 11/1986 | Hohne | 432/11 |
| 4,763,880 | 8/1988 | Smith et al. | 266/87 |
| 4,921,025 | 5/1990 | Tipton et al. | 148/16.5 |

FOREIGN PATENT DOCUMENTS

| | | | |
|---|---|---|---|
| 610554 | 12/1960 | Canada | |
| 2162208 | 1/1986 | United Kingdom | 148/206 |

Primary Examiner—Scott Kastler
Attorney, Agent, or Firm—Robert E. Muir

[57] ABSTRACT

A heat treat furnace system 20 for heat treating metal workpieces includes a rotary carburizing chamber 24 containing a carburizing atmosphere, a cooling chamber 40A or 40B adjacent the carburizing chamber 24, a gas barrier device 50 cooperating with the cooling chamber opening and the carburizing chamber outlet for impeding movement of atmosphere therethrough; and transfer mechanisms for operatively moving at least one selected workpiece from the carburizing chamber 24 to the cooling chamber 40A or 40B and vice versa, and from the cooling chamber 40B to the equalizing chamber 26 and vice versa. The carburizing chamber 24 has a circular rotatable hearth for supporting an array of workpieces, and an inlet for loading the workpieces into the carburizing chamber 24. The cooling chamber 40A or 40B also has means for providing a protective atmosphere within it. This arrangement provides a system that can perform different heat treat operations, either singly or simultaneously, and/or the same heat treat operation on different piece parts. For example, the system can simultaneously perform a process where carbides are desired and a process where carbides are not desired.

8 Claims, 2 Drawing Sheets

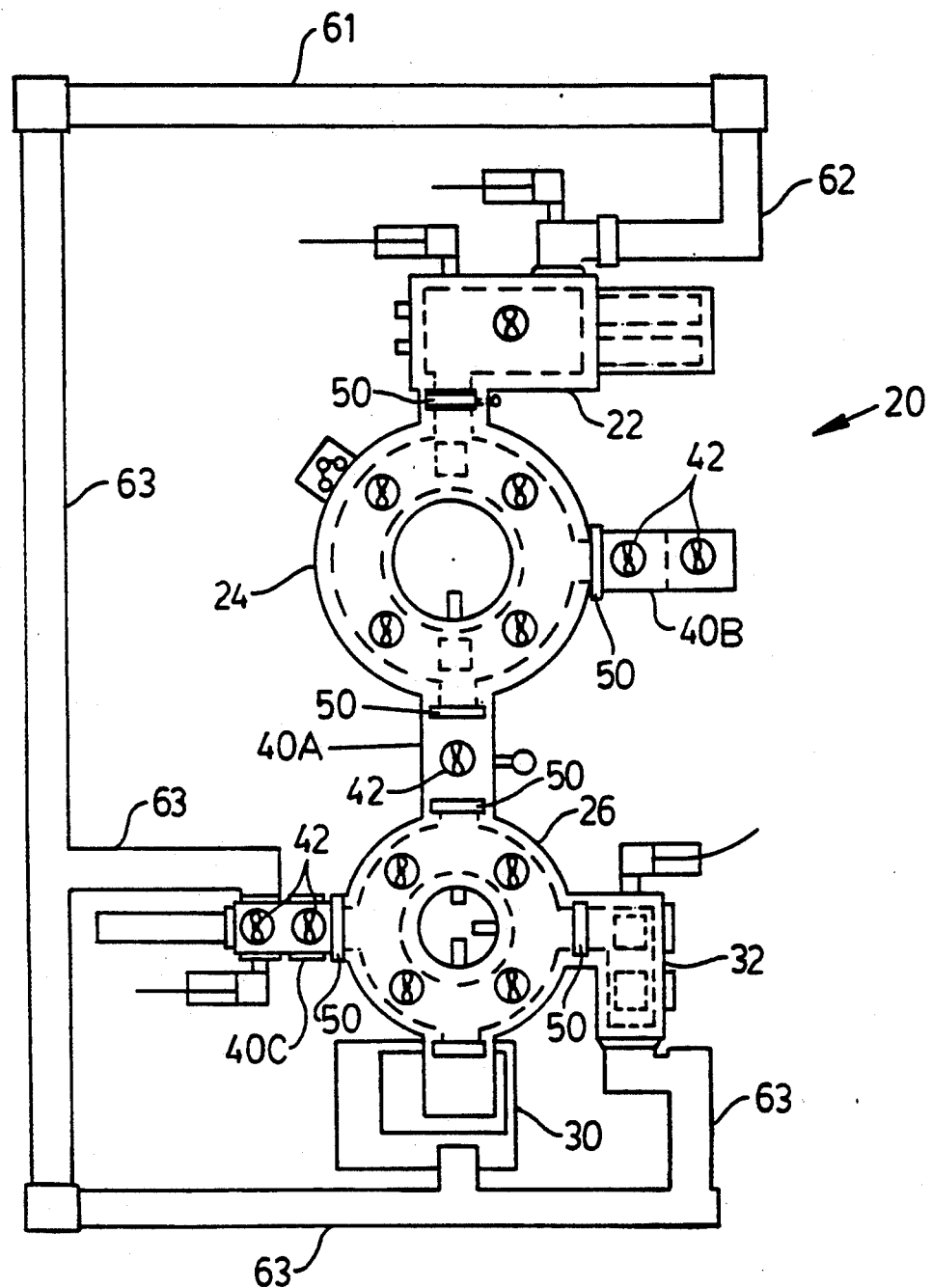

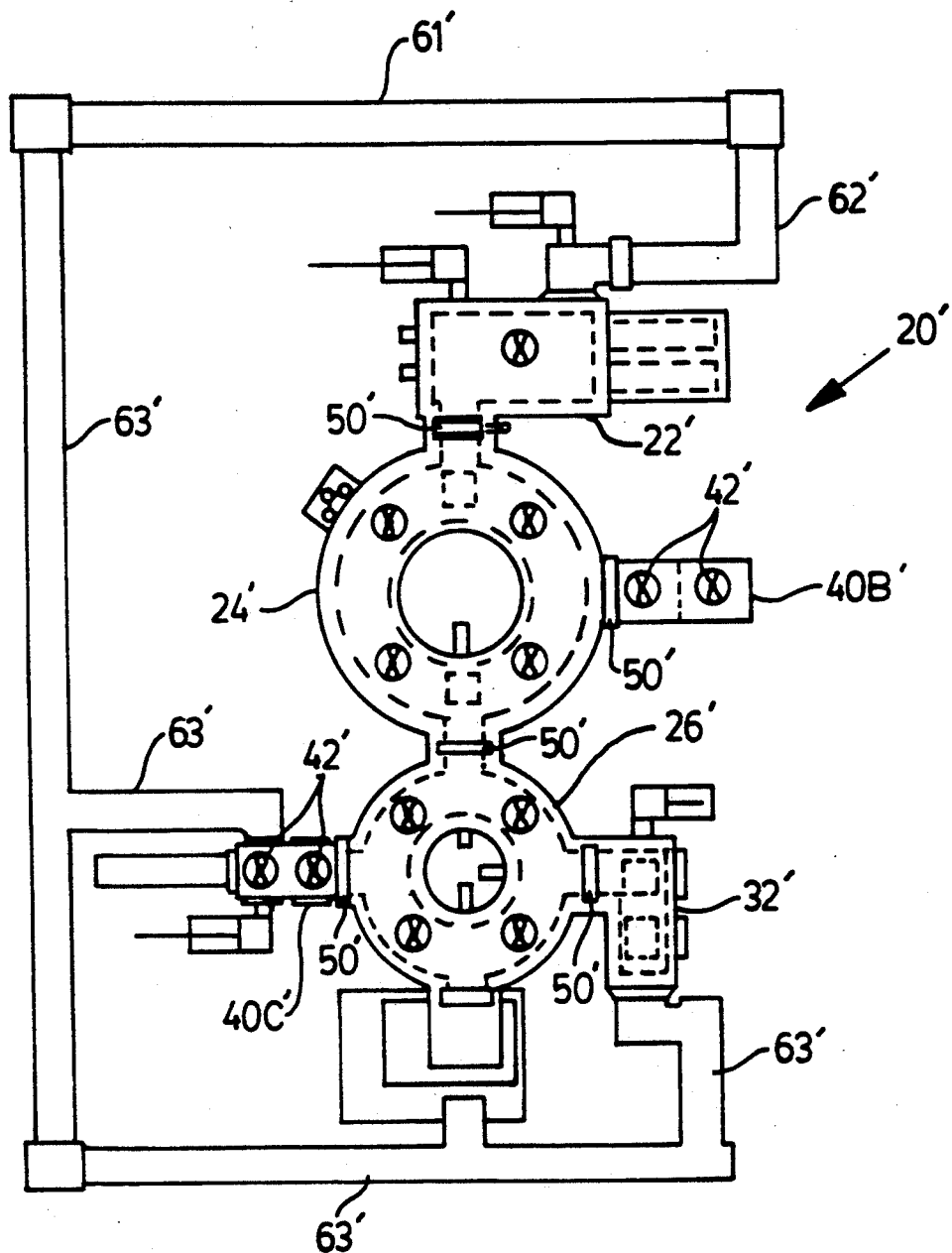
Fig_2_

HEAT TREAT FURNACE SYSTEM FOR PERFORMING DIFFERENT CARBURIZING PROCESSES SIMULTANEOUSLY

DESCRIPTION

1. Technical Field

This invention relates generally to heat treating steel, and more particularly to a heat treat furnace system and carburizing processes.

2. Background Art

Existing continuous carburizing furnace systems are designed to perform a particular carburizing process. Systems capable of performing multiple carburizing processes are run on a batch basis, i.e. one process at a time.

Existing continuous carburizing furnace systems include different chambers for separating the various steps of the carburizing process, i.e. heating, carburizing, cooling, equalizing and quenching. For example, U.S. Pat. No. 4,763,880 issued Aug. 16, 1988 describes a furnace system having, in sequence, a preheat chamber, a rotary carburizing chamber, a rotary diffusion chamber, and a rotary equalizing chamber. A cooling chamber, a batch quench chamber and a press quench chamber are connected to the equalizing chamber. While this system can process parts requiring different heat treatment cycles, the system is limited to performing substantially non-carbide processes (i.e. where the intent of the process is not to form high volume fractions of free carbides in the surface region of the microstructure). The system processes different parts to different case depths with or without quenching. It cannot, for example, perform a carbide process such as described in Canadian Patent No. 610,554 issued Dec. 23, 1960, or as described in U.S. Pat. No. 4,921,025 issued May 1, 1990.

It is desirable to have a system which can perform different carburizing processes simultaneously in a continuous type furnace system; for example a carbide process together with a substantially non-carbide process.

DISCLOSURE OF THE INVENTION

In one aspect of the present invention there is provided a heat treat furnace system for heat treating metal workpieces, including a rotary carburizing chamber containing a carburizing atmosphere and having an enclosed housing, a circular rotatable hearth within the housing for supporting an array of workpieces, an inlet for loading the workpieces into the chamber, and an outlet through which the workpieces may be discharged; a cooling chamber located adjacent the carburizing chamber and having an opening communicating with the outlet of the carburizing chamber, and means for providing a protective atmosphere within the cooling chamber; a gas barrier device cooperating with the cooling chamber opening and the carburizing chamber outlet for impeding movement of atmosphere between the carburizing chamber and the cooling chamber; and moving means for operatively moving at least one selected workpiece from the carburizing chamber to the cooling chamber and vice versa.

In another aspect of the invention there is provided a method of performing two different carburizing processes simultaneously on separate piece parts in a furnace system having a rotary carburizing chamber, an equalizing chamber and a cooling chamber. The method comprehends simultaneously performing any two of the following carburizing processes:

1) holding a piece part in the carburizing chamber for a time sufficient to build a desired case depth;

moving the piece part from the carburizing chamber directly to the equalizing chamber and holding the piece part therein for a time sufficient for the temperature of the first piece part to equal the temperature of the equalizing chamber; and removing the piece part from the equalizing chamber;

2) holding another piece part in the carburizing chamber for a time sufficient to build a desired case depth;

moving the other piece part from the carburizing chamber directly to the cooling chamber and cooling the other piece part;

moving the other piece part from the cooling chamber to the equalizing chamber and holding the other piece part therein for a time sufficient for the temperature of the other piece part to equal the temperature of the equalizing chamber; and removing the other piece part from the equalizing chamber;

3) placing still another piece part on a support in the carburizing chamber;

holding said piece part in the carburizing chamber for a time sufficient to build a portion of the desired case depth;

moving the said piece part from the carburizing chamber directly to the cooling chamber and cooling the said piece part;

returning the said piece part to the carburizing chamber for a time sufficient to build carbides; and cooling the said piece part after carbides are formed.

In the preferred method of the present invention, process 3) is performed simultaneously with either process 1) or 2) in a single furnace system. All three process are performed simultaneously in another aspect of the present invention.

BRIEF DESCRIPTION OF THE DRAWINGS

FIG. 1 is a diagrammatic plan view of a preferred heat treat system embodying the present invention and capable of performing the methods; and FIG. 2 is a diagrammatic plan view, similar to FIG. 1, but showing another embodiment.

BEST MODE FOR CARRYING OUT THE INVENTION

FIG. 1 illustrates a general layout or plan of a preferred continuous heat treat system 20. This system 20 includes several chambers through which piece parts (not shown) are moved during a carburizing process. A preheat chamber 22 is of conventional construction and serves to bring the parts to a carburizing temperature in a relatively neutral atmosphere. A carburizing chamber 24 is provided for imparting carbon into the piece part. It operates to build a case depth in the piece part and may also build carbides in the piece part. It is connected to the preheat chamber 22. The carburizing chamber 24 is preferably a rotary chamber and is shown as being donut-shaped. Advantageously it has a variable-cycle which permits parts to be received and/or discharged in any selected order independent of time or of sequence of input. An exemplary rotary chamber for this purpose is shown at 30 in FIG. 1 of U.S. Pat. No. 4,763,880, and the description of its structure is included herein by reference.

An equalizing chamber 26 is provided for bringing the piece part to a temperature required for hardening. It is similar in structure to the carburizing chamber 24. An exemplary equalizing chamber is shown at 34 in FIG. 1 of U.S. Pat. No. 4,763,880, and the description of its structure is included herein by reference.

A batch quench chamber 30 is connected to the equalizing chamber 26. Batch quench chamber 30 is a conventional device which includes an elevator (not shown) which lowers piece parts into a tank containing a quench medium such as oil. Thereafter the piece parts are raised for discharge.

A press quench chamber 32 is also connected to the equalizing chamber 26 for receiving piece parts therefrom. Press quench chamber 32 is also a conventional devices which includes a heating device (not shown) for maintaining the temperature of piece parts to a selected level. As shown chamber 32 has two positions for holding piece parts; however a single position may also be used.

In accordance with one feature of the present invention a cooling chamber 40A or 40B is located adjacent the carburizing chamber 24 and has an opening communicating with an outlet of the carburizing chamber 24. Another cooling chamber 40C is connected to the equalizing chamber 26. The cooling chambers 40A, 40B, 40C are operative to reduce the temperature of the piece part below the lower critical temperature known as $A_1$. It is not required that there be more than one cooling chamber; however if only one is provided it will be connected to the carburizing chamber 24. Multiple cooling chambers are particularly advantageous as will hereinafter become apparent. Each cooling chamber 40A, 40B or 40C may be of similar construction. Each is capable of cooling one or more trays of piece parts. The exact number of cooling positions in each cooling chamber is determined by throughput requirements. Each cooling chamber 40A, 40B, 40C has a water or oil cooled jacket and advantageously also has cooling plates or finned tube bundles (not shown). Each chamber may be equipped with one or more fans 42 to maximize the cooling rate.

It is important that there be provided a transfer mechanism between the carburizing chamber 24 and the cooling chamber 40A or 40B of the well-known type which can transfer a load of piece parts between the chambers in either direction. A similar transfer mechanism should be provided between cooling chamber 40A and equalizing chamber 26. In this manner a load of piece parts can be cycled between the cooling chamber 40A and either the carburizing chamber 24 or the equalizing chamber 26. Likewise a similar transfer mechanism is provided between cooling chamber 40C and equalizing chamber 26.

A plurality of gas barrier devices 50 are provided between adjacent chambers. Each device may be any conventional door structure which will impede movement of atmosphere between adjacent chambers. One suitable door structure is a double-door shown in FIG. 2 of U.S. Pat. No. 3,662,996, and the description thereof is incorporated herein by reference.

A load/unload conveyor 61 is provided for loading and unloading trays of piece parts. A charge conveyor 62 leads to the preheat chamber 22. A plurality of return conveyors 63 lead from the quench chambers 30, 32 and from the cooling chamber 40C back to the load/unload conveyor 61.

A second embodiment is shown in FIG. 2 and similar components are indicated by the same numerals used in the description of FIG. 1 but with the postscript prime ('). The major difference between the two embodiments is that there is no cooling chamber between the carburizing chamber 24' and equalizing chamber 26'. Both embodiments can be used to simultaneously perform the processes hereafter described.

INDUSTRIAL APPLICABILITY

As used herein the term "carburizing" includes processing in carbon-rich atmospheres as well as in carbon/nitrogen (carbonitriding) atmospheres. A typical carbon-rich atmosphere is composed of carbon monoxide, hydrogen, and nitrogen supplemented with enriching gases such as natural gas or propane as is well known to those skilled in the art. A typical carbonitriding atmosphere is a carbon-rich atmosphere supplemented with ammonia.

One process which can be performed in the above described heat treat furnace 20 is a carburize, equalize, and direct quench process. If practiced in heat treat furnace 20, it is believed that this process should have case depths limited (hence carburizing time limited) to prevent formation of a deleterious, excessively high carbon surface microstructure. This process includes the steps of:

heating a piece part to the carburizing temperature in the preheat chamber 22 having an atmosphere neutral to the base carbon of the piece part steel;

placing the heated piece part in the carburizing chamber 24;

maintaining a very carbon rich atmosphere (in excess of the carbon saturation limit) and a temperature (typically 1700° F. or 927° C.) of the carburizing chamber 24 at their desired settings;

holding the piece part in the carburizing chamber 24 for a time (typically one to ten hours) sufficient to build a desired case depth;

moving the piece part from the carburizing chamber 24 directly to the equalizing chamber 26 having a very carbon rich atmosphere (in excess of the carbon saturation limit);

holding the piece part in the equalizing chamber 26 for a time sufficient for the temperature of the first piece part to equal the temperature of the equalizing chamber 26 which is typically 1540° F. or 838° C.;

removing the piece part from the equalizing chamber 26; and either batch or press quenching the piece part.

This process typically produces a carbide free microstructure consisting of martensite and retained austenite.

Another process which can be performed in the heat treat furnace 20 is a carburize, cool, and reheat process. This process includes the steps of:

heating a piece part to the carburizing temperature in the preheat chamber 22 having an atmosphere neutral to the base carbon of the piece part steel;

placing the heated piece part in the carburizing chamber 24;

maintaining a very carbon rich atmosphere (in excess of the carbon saturation limit) and a temperature (typically 1700° F. or 927° C.) of the carburizing chamber 24 at their desired settings;

holding the piece part in the carburizing chamber 24 for a time sufficient to build only a case depth (time is wholly dependent upon the desired case depth and may be quite long);

moving the piece part from the carburizing chamber 24 directly to the cooling chamber 40A or 40B and cooling the piece part to a temperature below the lower critical ($A_1$) temperature;

moving the piece part from the cooling chamber 40A and 40B to the equalizing chamber 26 having a very carbon rich atmosphere (in excess of the carbon saturation limit);

holding the piece part therein for a time sufficient to reheat the piece part to the hardening temperature (typically 1540° F. or 838° C.); and removing the piece part from the equalizing chamber 26; and either bath or press quenching the piece part.

This process produces a microstructure consisting of martensite and retained austenite and may also contain a low volume friction of very fine carbides.

Yet another process which can be performed in the heat treat furnace 20 is a process involving multiple carburizing and cooling steps. This process includes the steps of:

heating a piece part to the carburizing temperature in the preheat chamber 22 having an atmosphere neutral to the base carbon of the piece part steel;

placing the heated piece part in the carburizing chamber 24;

maintaining a very carbon rich atmosphere (in excess of the carbon saturation limit) and a temperature (typically 1700° F. or 927° C.) of the carburizing chamber 24 at their desired settings;

holding the piece part in the carburizing chamber 24 for a time sufficient to build only a portion of the desired case depth;

moving the piece part from the carburizing chamber 24 directly to the cooling chamber 40A or 40B and cooling the piece part;

cycling the piece part between the carburizing chamber 24 and the cooling chamber 40A or 40B to build additional case depth and carbides;

cooling the said piece part after carbides are formed; and either batch or press quenching the piece part.

This process produces a microstructure consisting of martensite and retained austenite and will also contain a high volume fraction of carbides. As will be apparent to those skilled in the art, with minor alterations this process can be used to produce carbide structures described in the above noted Canadian Patent No. 610,554 or U.S. Pat. No. 4,921,025.

It is now deemed apparent that there has been disclosed a heat treat furnace which includes a unique arrangement of chambers. The cooling chamber 40A, 40A', 40B, 40B' is located adjacent the carburizing chamber 24, 24', either at a side as shown in FIGS. 1 and 2, or between the carburizing chamber 24, 24' and the equalizer chamber 26, 26' as shown in FIG. 1. This arrangement, together with the transfer mechanism which can transfer a load of piece parts between the carburizing and cooling chambers in either direction, provides a system that can perform different heat treat operations (such as described above), either singly or simultaneously, and/or the same operation on different piece parts.

Other aspects, features and advantages can be understood from a study of this disclosure together with the appended claims.

We claim:

1. A method of performing two different carburizing processes concurrently on separate piece parts in a furnace system having a rotary carburizing chamber, an equalizing chamber and an intermediate cooling chamber, but no diffusion chamber, the method comprising the steps of:

placing first and second piece parts on separate supports in the carburizing chamber;

maintaining the atmosphere and temperature of the carburizing chamber at their desired settings;

holding the first piece part in the carburizing chamber for a time sufficient to build a desired case depth;

moving the first piece part from the carburizing chamber through to the cooling chamber to the equalizing chamber and holding the first piece part therein f or a time sufficient for the temperature of the first piece part to equal the temperature of the equaling chamber;

removing the first piece part from the equalizing chamber;

simultaneously holding the second piece part in the carburizing chamber for a time sufficient to build a desired case depth;

moving the second piece part from the carburizing chamber directly to the cooling chamber and cooling the second piece part;

moving the second piece part from the cooling chamber to the equalizing chamber and holding the second piece part therein for a time sufficient for the temperature of the second piece part to equal the temperature of the equalizing chamber; and removing the second piece part from the equalizing chamber;

whereby two different carburizing processes are concurrently performed on separate piece parts in a single furnace system.

2. A method according to claim 1, including the step of moving at least one of the piece parts from the equalizing chamber directly to a quench chamber.

3. A method of performing three different carburizing processes simultaneously on separate piece parts in a furnace system having a rotary carburizing chamber, an equalizing chamber and a cooling chamber, but no diffusion chamber, the method comprising the steps of:

placing first, second and third piece parts on separate supports in the carburizing chamber;

maintaining the atmosphere and temperature of the carburizing chamber at their desired settings;

holding the first piece part in the carburizing chamber for a time sufficient to build a desired case depth;

moving the first piece part from the carburizing chamber to the equalizing chamber and holding the first piece part therein for a time sufficient for the temperature of the first piece part to equal the temperature of the equalizing chamber;

removing the first piece part from the equalizing chamber;

simultaneously holding the second piece part in the carburizing chamber for a time sufficient to build a desired case depth;

moving the second piece part from the carburizing chamber directly to the cooling chamber and cooling the second piece part;

moving the second piece part from the cooling chamber to the equalizing chamber and holding the second piece part therein for a time sufficient for the temperature of the second piece part to equal the temperature of the equalizing chamber;

removing the second piece part from the equalizing chamber;

holding the third piece part in the carburizing chamber for at time sufficient to build a portion of the desired case depth;

moving the third piece part from the carburizing chamber directly to the cooling chamber and cooling the third piece part;

returning the third piece part to the carburizing chamber for a time sufficient to build carbides; and cooling the third piece part after carbides are formed;

whereby three different carburizing processes are concurrently performed on separate piece parts in a single furnace system.

4. A method according to claim 3, wherein the third piece part is further cycled between the carburizing chamber and the cooling chamber a plurality of times.

5. A method of performing two different carburizing processes simultaneously on separate piece parts in a furnace system having a rotary carburizing chamber, an equalizing chamber and a cooling chamber, the method comprising the steps of:

placing first and second piece parts on separate supports in the carburizing chamber;

maintaining the atmosphere and temperature of the carburizing chamber at their desired settings;

holding the first piece part in the carburizing chamber for a time sufficient to build a desired case depth;

moving the first piece part from the carburizing chamber directly to the cooling chamber and cooling the third piece part;

returning the first piece part to the carburizing chamber for a time sufficient to build carbides;

cooling the first piece part after carbides are formed;

simultaneously holding the second piece part in the carburizing chamber for a time sufficient to build a desired case depth;

moving the second piece part from the carburizing chamber directly to the cooling chamber and cooling the second piece part;

moving the second piece part from the cooling chamber to the equalizing chamber and holding the second piece part therein for a time sufficient for the temperature of the second piece part to equal the temperature of the equalizing chamber; and removing the second piece part from the equalizing chamber;

whereby two separate carburizing processes are simultaneously performed on separate piece parts in a single furnace system.

6. A method of performing two different carburize simultaneously on separate piece parts in a furnace system having a rotary carburizing chamber, an equalizing chamber and a cooling chamber, the method comprising the steps of:

placing first and second piece parts on separate supports in the carburizing chamber;

maintaining the atmosphere and temperature of the carburizing chamber at their desired settings;

holding the first piece part in the carburizing chamber for a time sufficient to build a portion of the desired case depth;

moving the first piece part from the carburizing chamber directly to the cooling chamber and cooling the first piece part;

returning the first piece part to the carburizing chamber for a time sufficient to build carbides;

cooling the first piece part after carbides are formed;

holding the second piece part in the carburizing chamber for a time sufficient to build a desired case depth;

moving the second piece part from the carburizing chamber directly to the equalizing chamber and holding the second piece part therein for a time sufficient for the temperature of the second piece part to equal the temperature of the equalizing chamber; and removing the second piece part from the equalizing chamber;

whereby two separate carburizing processes are simultaneously performed on separate piece parts in a single furnace system.

7. A method according to claim 6, wherein the first piece part is further cycled between the carburizing chamber and the cooling chamber a plurality of times.

8. A method of performing two different carburizing processes simultaneously on separate piece parts in a furnace system having a rotary carburizing chamber, an equalizing chamber and a cooling chamber immediately adjacent and connected to the carburizing chamber, the method comprising the steps of:

placing first and second piece parts on separate supports in the carburizing chamber;

maintaining the atmosphere and temperature of the carburizing chamber at their desired settings;

holding the first piece part in the carburizing chamber for a time sufficient to build a desired case depth;

moving the first piece part from the carburizing chamber directly to the equalizing chamber and holding the first piece part therein for a time sufficient for the temperature of the first piece part to equal the temperature of the equalizing chamber;

removing the first piece part from the equalizing chamber;

simultaneously holding the second piece part in the carburizing chamber for at time sufficient to build a desired case depth;

moving the second piece part from the carburizing chamber directly to the immediately adjacent cooling chamber and cooling the second piece part;

moving the second piece part from the cooling chamber to the equalizing chamber and holding the second piece part therein for a time sufficient for the temperature of the second piece part to equal the temperature of the equalizing chamber; and removing the second piece part from the equalizing chamber;

whereby two separate carburizing processes are simultaneously performed on separate piece parts in a single furnace system.

* * * * *

UNITED STATES PATENT AND TRADEMARK OFFICE
CERTIFICATE OF CORRECTION

PATENT NO. : 5,324,366
DATED : June 28, 1994
INVENTOR(S) : Gary D. Keil et al

It is certified that error appears in the above-identified patent and that said Letters Patent is hereby corrected as shown below:

In claim 1, column 6, line 16, after "through" delete "to".

In claim 1, column 6, line 18, after "f" delete the extra space.

In claim 1, column 6, line 20, delete "equaling" and add --equalizing--.

In claim 6, column 7, line 55, delete "carburize" after "different" and add --carburizing processes-- after "different".

Signed and Sealed this

Fourteenth Day of February, 1995

Attest:

BRUCE LEHMAN

Attesting Officer

Commissioner of Patents and Trademarks